(12) United States Patent
Liu

(10) Patent No.: US 7,175,353 B2
(45) Date of Patent: Feb. 13, 2007

(54) DUPLEX OPTICAL TRANSCEIVER

(76) Inventor: Chin Ju Liu, No. 25, Lane 174, Sec. 2, Dong Hwa St., Bei Tou Dt., Taipei (TW)

( * ) Notice: Subject to any disclaimer, the term of this patent is extended or adjusted under 35 U.S.C. 154(b) by 318 days.

(21) Appl. No.: 10/807,201

(22) Filed: Mar. 24, 2004

(65) Prior Publication Data
US 2005/0213984 A1    Sep. 29, 2005

(51) Int. Cl.
*G02B 6/36* (2006.01)
(52) U.S. Cl. ............................... 385/92; 385/53; 385/88
(58) Field of Classification Search ................. 385/53, 385/88, 92
See application file for complete search history.

(56) References Cited

U.S. PATENT DOCUMENTS 5,469,841 A * 11/1995 Kobayashi et al. ......... 600/158
6,827,506 B2 * 12/2004 Chen ............................ 385/93

* cited by examiner

*Primary Examiner*—Jennifer Doan
(74) *Attorney, Agent, or Firm*—Troxell Law Office, PLLC

(57) ABSTRACT

A duplex optical transceiver comprises a connector for optical cable with an optical cable lengthwise disposed therein, a ring-shaped clinging member formed of metal a hollow, cylindrical body formed of plastic, the body including a first opening at an open end coupled to a light source, a second opening on the peripheral surface coupled to a sensor, and a recessed, annular shoulder at the other end, and a filter mirror disposed within the body for deflecting light emitted by the light source to an optical fiber of the optical cable and reflecting light incident onto the optical fiber to the sensor. The clinging member is insertable into the shoulder for fastening by snapping.

1 Claim, 3 Drawing Sheets

DUPLEX OPTICAL TRANSCEIVER

BACKGROUND OF THE INVENTION

1. Field of the Invention

The present invention relates to optical transceivers and more particularly to a duplex optical transceiver having a clinging member and a body secured together by snapping.

2. Description of Related Art

Duplex, as used in optics, means two messages can be sent simultaneously in opposite directions over an optical cable containing one or more optical fibers. This can save the consumption of optical cable, resulting in a reduction in the installation cost particularly for installing optical cable in a long distance. In a duplex optical system, an optical transceiver is required to install at the end of an optical cable. As such, the transceiver is adapted to deflect emitted light to an optical fiber or reflect incident light to a sensor.

A conventional duplex optical transceiver is shown in FIGS. 1A and 1B. The transceiver comprises a metal body 1 including a first opening coupled to a light source 2, a second opening coupled to a sensor 3, and a third opening coupled to a connector for optical cable 4. The connector for optical cable 4 comprises an internal cylindrical member 6 coupled to one end of an optical cable (not shown). An alignment of the connector for optical cable 4 with the body 1 is required prior to coupling together in order to align with the optical fiber of an optical cable. A filter mirror 5 is provided in the body 1. The filter mirror 5 is adapted to deflect emitted light from the light source 2 to the optical fiber. Further, light incident onto the optical fiber is reflected to the sensor 3 by the filter mirror 5.

In view of the above, a number of components are required to assemble with the body 1 in order to form a complete connecting device. This inevitably will increase the manufacturing difficulties. Further, the body 1 is shaved by a plane. To the contrary, the sleeve 7 of the connector for optical cable 4 is shaped by a lathe. As such, machining of both the body 1 and the sleeve 7 is complicated, and tolerance therebetween can be increased to an unacceptable level, resulting in a poor optical transmission quality. Hence, a need for improvement exists.

SUMMARY OF THE INVENTION

It is an object of the present invention to provide a duplex optical transceiver comprising a light source; a sensor; a connector for optical cable, the connector for optical cable including an optical cable lengthwise disposed therein; a ring-shaped clinging member formed of metal; a hollow, cylindrical body formed of plastic, the body including a first opening at an open end coupled to the light source, a second opening on the peripheral surface coupled to the sensor, and a recessed, annular shoulder at the other end; and a filter mirror disposed within the body for deflecting light emitted by the light source to an optical fiber of the optical cable and reflecting light incident onto the optical fiber to the sensor, wherein the clinging member is operative to insert into the shoulder for fastening by snapping.

In one aspect of the present invention the shoulder has an internal, annular ridge and the clinging member has an outer, annular groove being operative to matingly secure to the ridge when the clinging member and the shoulder are fastened together.

The above and other objects, features and advantages of the present invention will become apparent from the following detailed description taken with the accompanying drawings.

DETAILED DESCRIPTION OF THE PREFERRED EMBODIMENTS

Figure 1A:
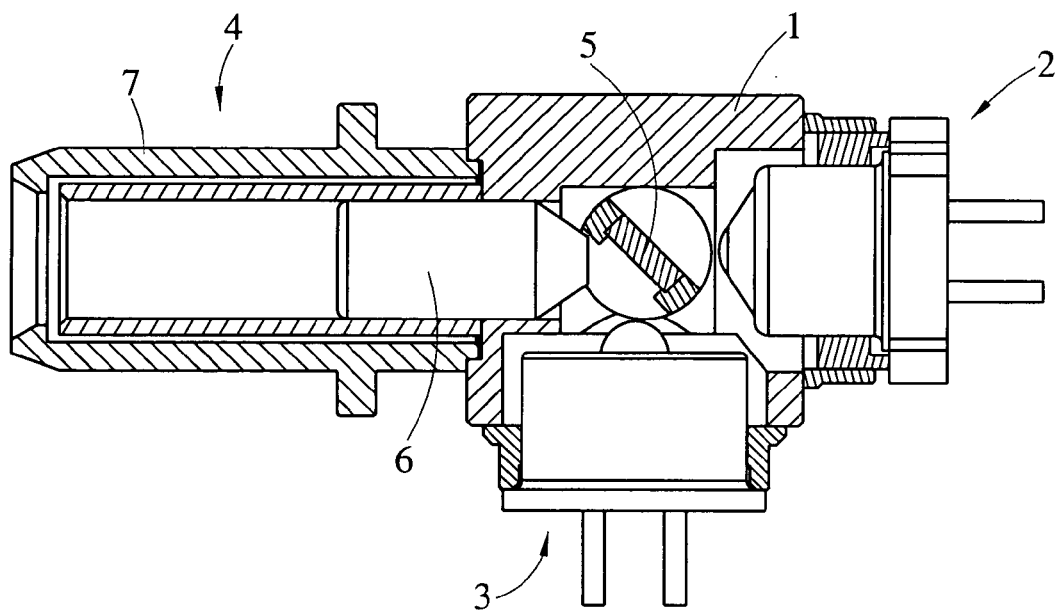
FIG. 1A is a sectional view of a conventional duplex optical transceiver.
Figure 1B:
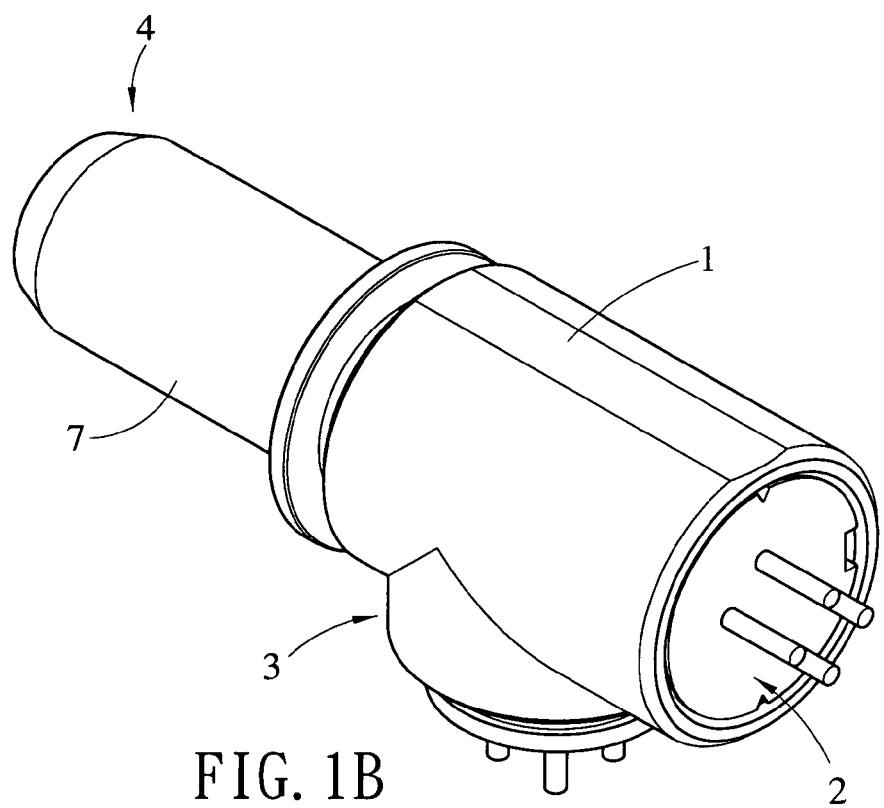
FIG. 1B is a perspective view of the transceiver shown in FIG. 1A.
Figure 2:
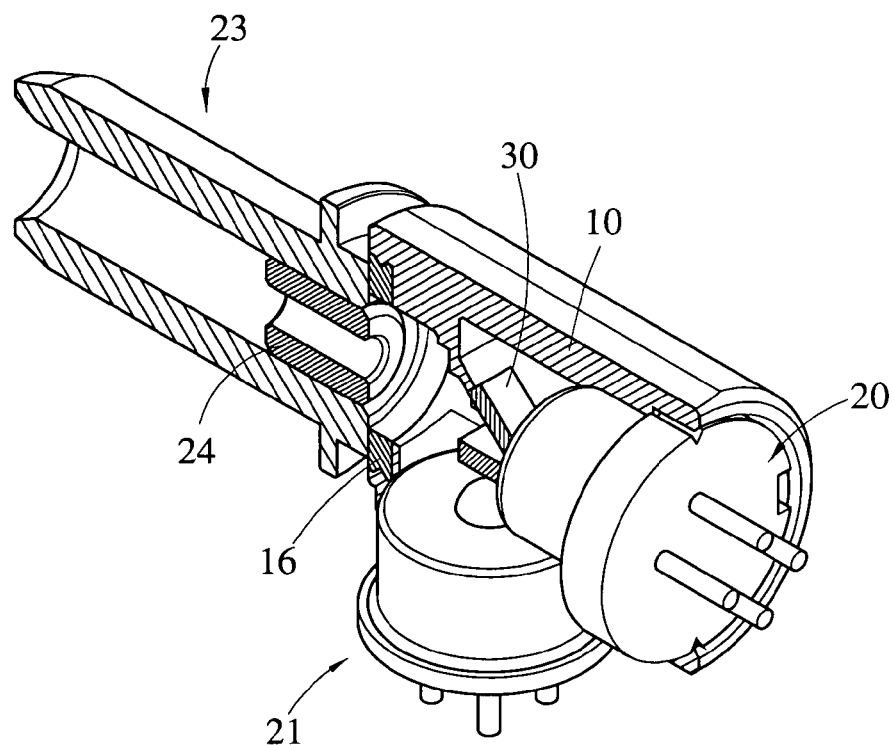
FIG. 2 is a broken away perspective view of a duplex optical transceiver according to the invention.
Figure 3:
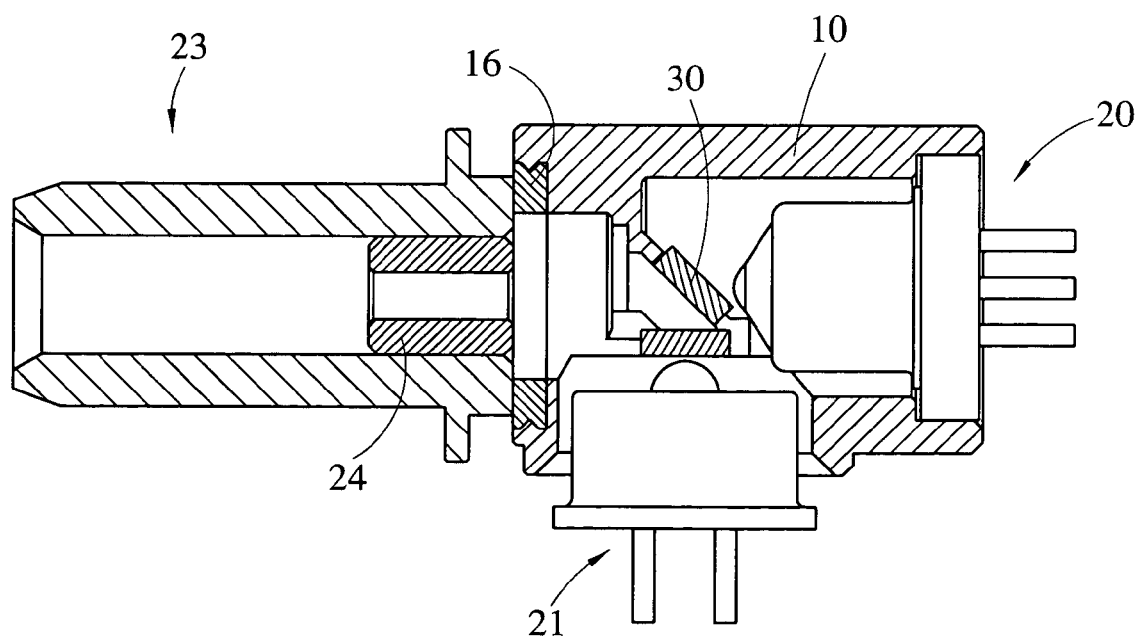
FIG. 3 is a sectional view of the transceiver shown in FIG. 2.
Figure 4:
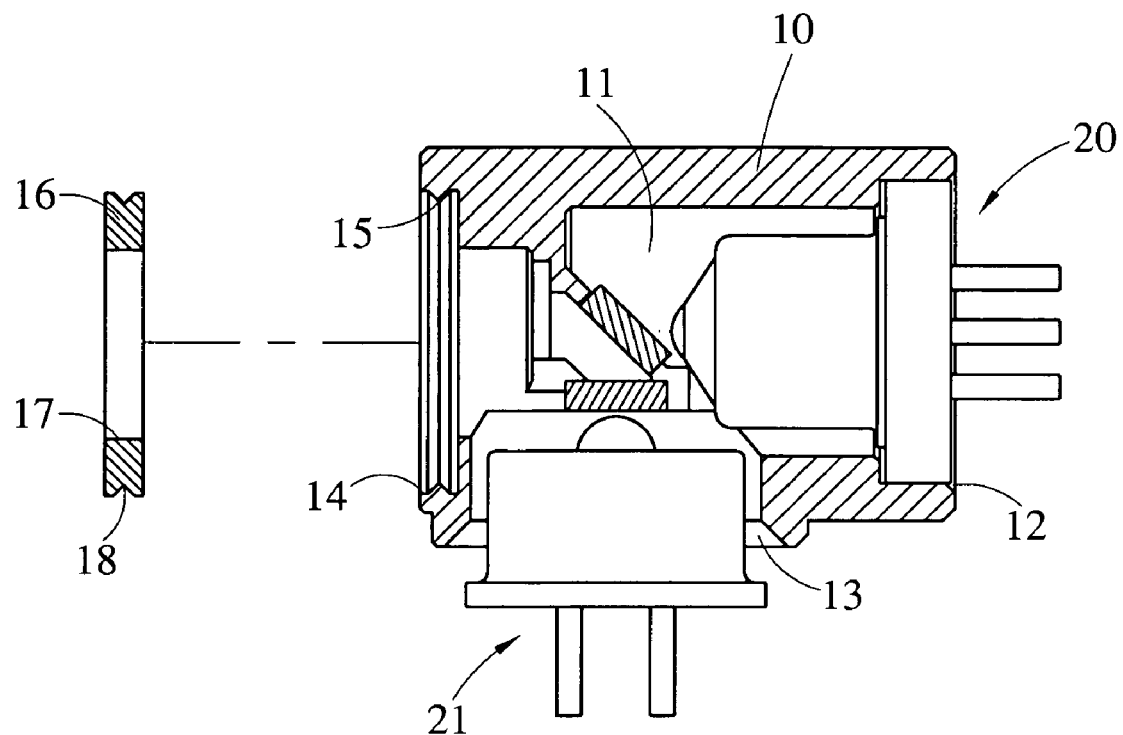
FIG. 4 is a sectional view of the body and the separate clinging member.
Figure 5:
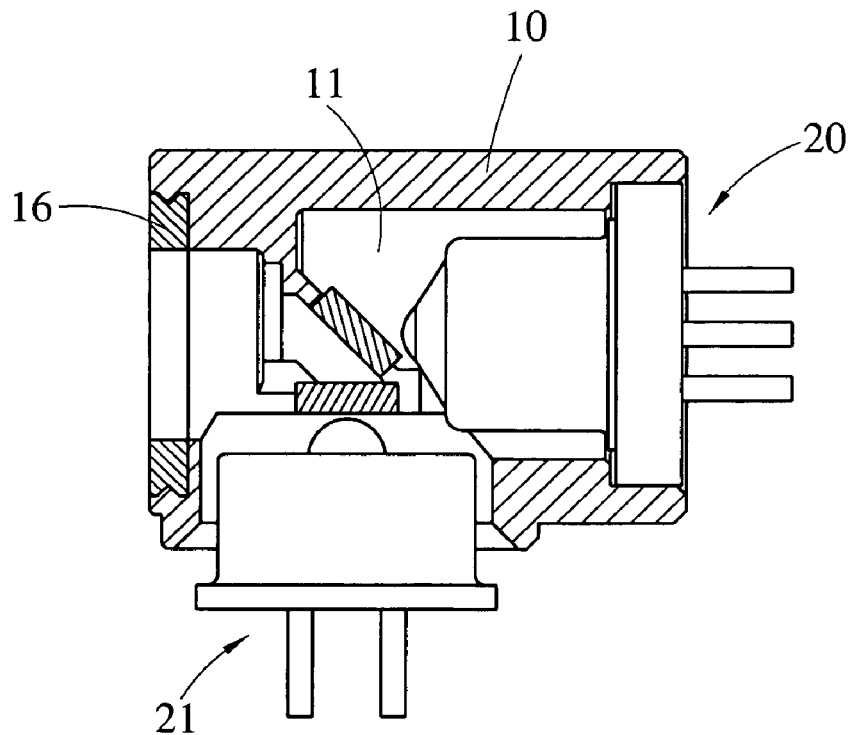
FIG. 5 is a sectional view of the coupled body and the clinging member.

Referring to FIGS. 2 to 5, there is shown a duplex optical transceiver constructed in accordance with the invention. The transceiver comprises a plastic body 10, a ring-shaped metal clinging member 16, and a connector for optical cable 23. Each component will be described in detail below.

The body 10 comprises a longitudinal channel 11 having a T-section. The channel 11 comprises a first opening 12 at an open end coupled to a light source 20, a second opening 13 on the peripheral surface (i.e., being perpendicular to the first opening 12) coupled to a sensor 21, and a recessed, annular shoulder 14 at the other end (i.e., opposite to the first opening 12), the shoulder 14 having an internal, annular ridge 15. The light source 20 and the sensor 21 are coupled to the first and the second openings 12 and 13 by laser welding respectively.

The clinging member 16 comprises a bore 17 having a diameter about the same as that of the channel 11. An annular groove 18 is formed on an outer surface of the clinging member 16. In a manufacturing process, the clinging member 16 is placed in a mold of the body 10. Next, the body 10 is formed by injection molding. Finally, the clinging member 16 and the body 10 are secured together by snapping the ridge 15 into the groove 1 since the shape of the clinging member 16 is matingly conformed to that of the shoulder 14 (see FIG. 5).

One end of the connector for optical cable 23 is coupled to the other end of the clinging member 16 by laser welding. The connector for optical cable 23 comprises an internal cylindrical member 24 for receiving an optical cable (not shown). An alignment of an optical fiber of the optical cable with both the light source 20 and the sensor 21 is required prior to coupling the connector for optical cable 23 and the clinging member 16 together. As such, light emitted by the light source 20 can be deflected to the optical fiber. Further, light incident onto the optical fiber is reflected to the sensor 21 (see FIG. 3). Moreover, a filter mirror 30 is provided within the channel 11. Hence, light emitted by the light source 20 is deflected to the optical fiber by the filter mirror 30. Further, light incident onto the optical fiber is reflected to the sensor 21 by the filter mirror 30.

In brief, the clinging member 16 and the body 10 are secured together by snapping according to the present invention. The benefits of the invention thus include a reduced number of components to be assembled, less machining problems, reduced manufacturing cost, no increase of tolerance between the connector for optical cable and the body, and improved optical transmission quality.

While the invention herein disclosed has been described by means of specific embodiments, numerous modifications and variations could be made thereto by those skilled in the art without departing from the scope and spirit of the invention set forth in the claims.

What is claimed is:

1. A duplex optical transceiver, comprising:
   a light source;
   a sensor;
   a connector for optical cable, the connector for optical cable including an optical cable lengthwise disposed therein;
   a ring-shaped clinging member formed of metal;
   a hollow, cylindrical body formed of plastic, the body including a first opening at an open end coupled to the light source, a second opening on the peripheral surface coupled to the sensor, and a recessed, annular shoulder at the other end; and
   a filter mirror disposed within the body for deflecting light emitted by the light source to an optical fiber of the optical cable and reflecting light incident onto the optical fiber to the sensor,
   wherein the clinging member is operative to insert into the shoulder for fastening by snapping, and
   wherein the shoulder has an internal, annular ridge and the clinging member has an outer, annular groove being operative to matingly secure to the ridge when the clinging member and the shoulder are fastened together.

* * * * *